United States Patent [19]
Capers, Jr. et al.

[11] Patent Number: 6,049,698
[45] Date of Patent: Apr. 11, 2000

[54] APPARATUS AND METHOD FOR INITIATING A REMINDER ALARM ACTION IN A SUBSCRIBER UNIT

[75] Inventors: Seth Murph Capers, Jr., Roanoke; Robert Louis Breeden, Colleyville; Thomas Edward Scott, Jr., Fort Worth, all of Tex.

[73] Assignee: Motorola, Inc., Schaumburg, Ill.

[21] Appl. No.: 08/996,967

[22] Filed: Dec. 23, 1997

[51] Int. Cl.[7] .................. H04B 7/00; H04Q 1/30
[52] U.S. Cl. .............. 455/38.2; 340/311.1; 340/825.44
[58] Field of Search .................... 455/38.2, 66, 11.1, 455/38.4, 38.5, 552, 557, 575, 524; 348/232, 333, 222; 340/505, 539, 825.44, 554, 311.1

[56] References Cited

U.S. PATENT DOCUMENTS

| | | | |
|---|---|---|---|
| 5,012,219 | 4/1991 | Henry | 340/311.1 |
| 5,504,476 | 4/1996 | Marrs et al. | 340/825.44 |
| 5,621,458 | 4/1997 | Mann et al. | 348/232 |
| 5,729,196 | 3/1998 | Aljadeff et al. | 340/505 |
| 5,777,991 | 7/1998 | Adachi et al. | 370/352 |

*Primary Examiner*—Fan S. Tsang
*Assistant Examiner*—Sheila Smith
*Attorney, Agent, or Firm*—R. Louis Breeden

[57] ABSTRACT

A subscriber unit (100) of a messaging system initiates (226) a reminder alarm action. The user generates (210) an intended message to be sent as an inbound message with a user interface (114). The processing system (106) of the subscriber unit (100) evaluates (214) a characteristic of the intended message, and initiates (226) the reminder alarm action in response to the evaluating (214) step. The processing system (106) and the coupled transmitter transmit (228, 242) the inbound message.

14 Claims, 2 Drawing Sheets

APPARATUS AND METHOD FOR INITIATING A REMINDER ALARM ACTION IN A SUBSCRIBER UNIT

FIELD OF THE INVENTION

This invention relates generally to communication systems and more specifically to an apparatus and corresponding method of initiating a reminder alarm action in a subscriber unit.

BACKGROUND OF THE INVENTION

Subscriber units, and specifically messaging and paging subscriber units, typically have the capability to reliably validate receipt (ACK) of one-way paging messages and to generate two-way messaging responses within a messaging system. In normal operation subscriber units within two-way messaging systems validate receipt (ACK) and respond to messages containing unique addressing information that specifically identifies the subscriber unit.

In order for the subscriber unit to validate receipt or generate a reply, the subscriber unit must first receive an outbound message from the infrastructure, which in turn triggers a notification alert to be communicated to the user. The user then de-activates the notification alert, and optionally can generate a response on the inbound channel. In any event, the notification alert is no longer communicated to the user. In cases where the response generated may require subsequent action by the user, and the user may be unable to immediately complete the subsequent action, the user may desire a subsequent reminder of unfinished tasks relating to the message.

Thus, what is needed is a method of initiating a reminder alarm action in a subscriber unit of a messaging system. The method and apparatus preferably will allow the user, with minimal user interaction, to avoid unintentional de-activation of the notification alarm and subsequently to fall short of timely completion of tasks related to the outbound message.

DETAILED DESCRIPTION OF A PREFERRED EMBODIMENT

The present disclosure concerns subscriber units, and specifically messaging and paging subscriber units that typically have the capability to reliably receive messages in a messaging system. The subscriber units operating within the messaging system are arranged to provide efficient paging or messaging capability along with reliable reminder alarm actions.

A preferred method embodiment, set in a subscriber unit (SU), is a method of initiating a reminder alarm action in a subscriber unit of a messaging system, the method comprising the steps of: generating, by a user of the subscriber unit, an intended message to be sent as an inbound message; evaluating a characteristic of the intended message; and initiating the reminder alarm action in response to the evaluating step.

The steps of evaluating and initiating, respectively, preferably include a step of determining whether the intended message is incomplete, and a step of setting a reminder alarm in response to determining that the intended message is incomplete. The steps of evaluating and initiating, respectively, alternately include a step of comparing an address to which the intended message is to be sent with a list of addresses stored in the subscriber unit, and a step of initiating the reminder alarm action in response to finding a matching address in the list of addresses. Preferably, the process of initiating in the method includes a step of setting a reminder alarm, yet in an alternative form the process of initiating includes a step of displaying an alarm action menu. In one form, the step of evaluating further includes a step of negating the step of initiating the reminder alarm action.

In another form, the steps of generating and evaluating in the method include, respectively, a step of selecting, by the user of the subscriber unit, a programmed message to be sent as the inbound message, and a step of accessing an alarm action indication corresponding to the programmed message. An additional embodiment of the steps of evaluating and initiating in the method include, respectively, a step of comparing a character string of the intended message with a list of character strings stored in the subscriber unit, and a step of initiating the reminder alarm action in response to finding a matching character string in the list of character strings.

A preferred apparatus embodiment of the instant invention in a selective messaging unit arranged and constructed to implement the aforementioned methodology is further explained below.

Figure 1:
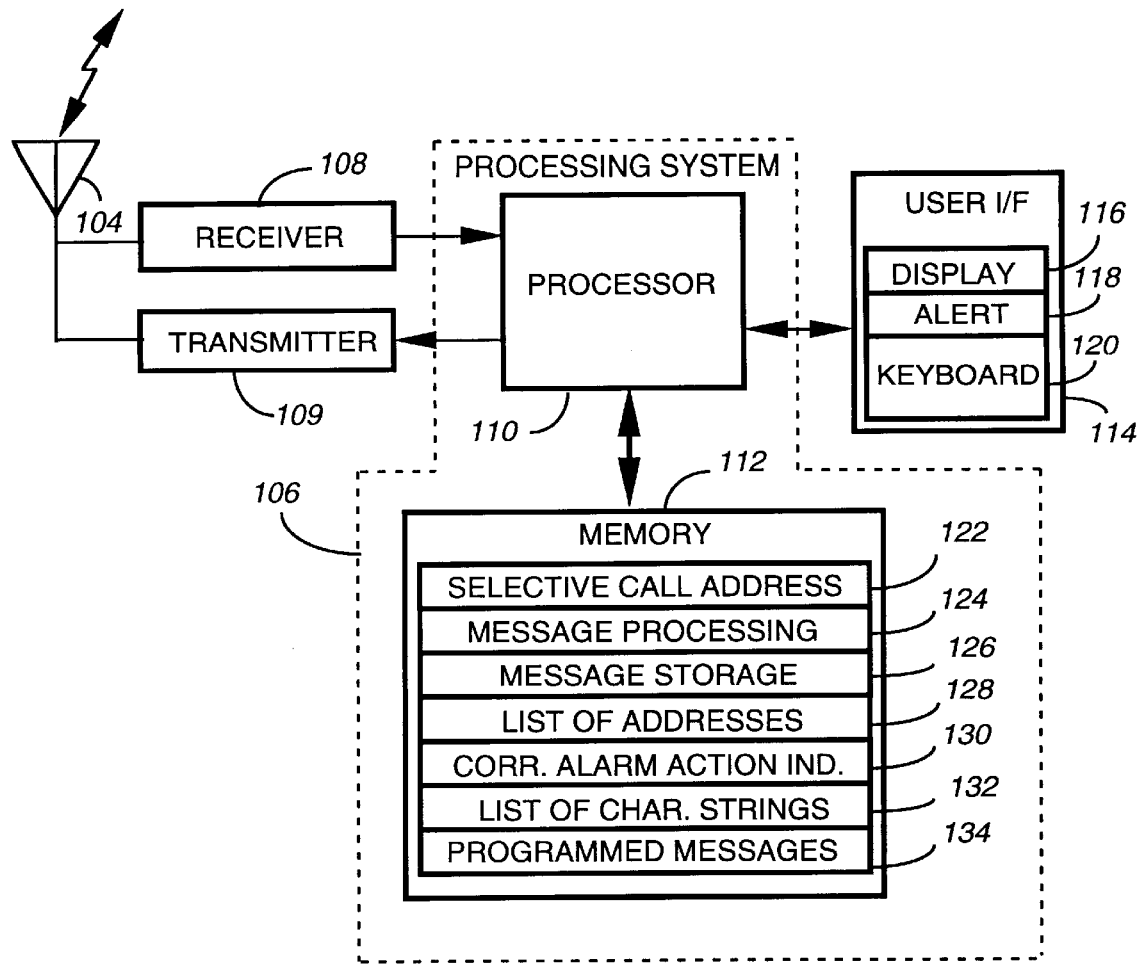
FIG. 1 is an electrical block diagram of a subscriber unit in accordance with the instant invention.

Referring to FIG. 1, an electrical block diagram of an electronic device in accordance with the instant invention depicts, by way of example, a portable subscriber unit 100 such as can be used with a conventional two-way radio messaging system infrastructure. The portable subscriber unit 100 comprises an antenna 104 for intercepting an outbound message and for transmitting an inbound message. The antenna 104 is coupled to a conventional receiver 108 for receiving the outbound message and is also coupled to a conventional transmitter 109 for transmitting the inbound message. The receiver 108 and the transmitter 109 are coupled to a processing system 106 for processing the outbound and inbound messages and for controlling the portable subscriber unit 100 in accordance with the instant invention. A user interface 114 is also coupled to the processing system for interfacing with a user. The user interface comprises a conventional display 116 for displaying the inbound and outbound messages, a conventional alert element 118 for alerting the user when the outbound message arrives, and further for alerting the user of a reminder alarm action in accordance with the present invention as will be further explained below, and a conventional keyboard 120 for acknowledging receipt of an outbound message from the messaging system, generating the inbound message, and for controlling the portable subscriber unit 100. The processing system 106 comprises a conventional processor 110 and a conventional memory 112. The memory 112 comprises software elements and other variables for programming the processing system 106 in accordance with the instant invention. The memory 112 includes a selective call address 122 to which the portable subscriber unit 100 is responsive, and a message processing element 124 for processing inbound and outbound messages through well-known radio messaging techniques. The memory 112 further comprises a message storage area 126 for storing the inbound and outbound messages, a list of addresses 128 for storing addressing information for other electronic devices. This addressing information preferably consists of flags or pointers corresponding to a user-generated address book stored in another location not explicitly depicted within the memory 106, or the addressing information alternately represents additional lists of addresses in applications where redundancy is appropriate. The list of addresses can also comprise an Internet Protocol (IP) address or other known physical, data level, or network level nomenclature that uniquely identifies coupled electronic devices. A corresponding alarm action indication 130 is an area in memory for storing various indications and corresponding actions related to the indications. A list of character strings 132 is an area of memory for storing character strings used for identifying messages requiring an alarm action. Programmed messages 134 can also be stored in the memory 112. The programmed messages 134 are comprised of messages programmed in the SU 100 by the manufacturer, service provider, or the user of the SU 100, as well as programmed messages received as a part of outbound messages from the messaging system. It is to be understood that the FIG. 1 portable subscriber unit is exemplary only and that much other equipment not here shown nor here relevant may be required in a practical portable subscriber unit.

Figure 2:
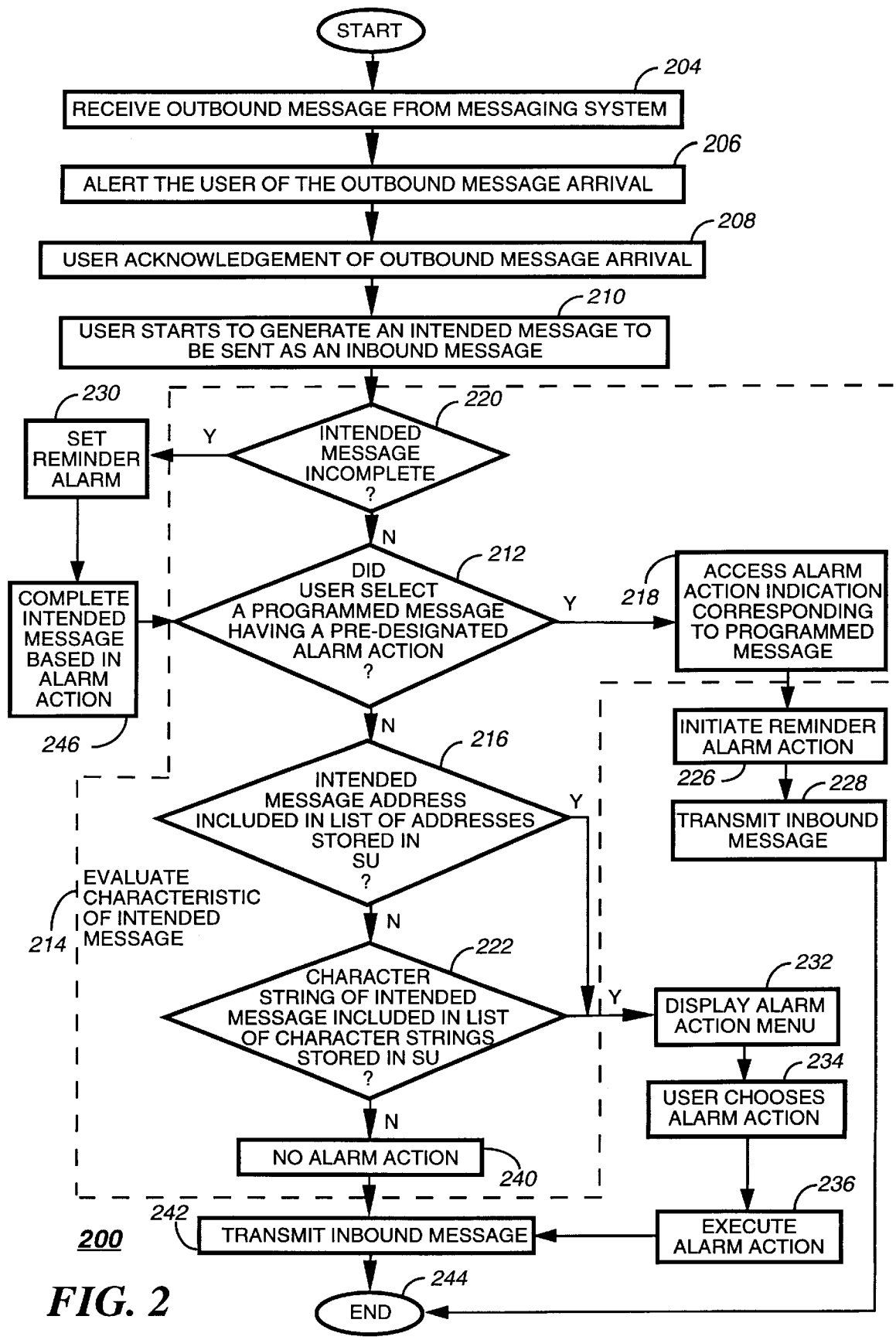
FIG. 2 is a flow chart depicting operation of the subscriber unit in accordance with the instant invention.

Referring to FIG. 2, a flowchart depicts operation of an electronic device, such as the SU 100, implementing the method of initiating a reminder alarm action. The method begins with step 204 when the antenna 104 and the coupled receiver 108 of the subscriber unit SU 100 receive an outbound message from the messaging system. In step 206, the conventional alert element 118 of the SU 100 alerts the user of the outbound message arrival. Subsequently, the user will acknowledge arrival of the outbound message from the messaging system in step 208 utilizing generally known capabilities of the user interface 114. Once the user acknowledges the outbound message arrival, the user may need the option of initiating a reminder alarm action in the SU 100, especially if the outbound message requires action that the user may be unable to complete at the time of message receipt. In step 210, the user utilizes the keyboard 120 or other known input mechanism within the user interface 114 to start to generate an intended message to be sent as an inbound message to the messaging system with a possible final destination being another electronic device. The reader will appreciate that the subscriber unit 100 and the messaging system will be connected to other electronic devices via telephone lines, radio link, satellite link or any suitable media operating with any known suitable networking or communication protocol.

The method continues on to step 220 to determine if the intended message is incomplete. This intended message of step 220 refers to an inbound message that the user of the SU 100 intends to use as a reply to the outbound message received in step 204. For example, an incomplete message can occur when the user invokes the user interface 114 to begin composing a reply destined to become an inbound message, yet the user does not complete the inbound message or, alternatively, if the user fails to notify the processing system 106 to transmit the inbound message prior to a predetermined time-out sequence. If the processing system 106 does not receive an appropriate action from the user via the user interface 114 in a timely manner, the processing system 106 will temporarily suspend further action on the inbound message awaiting further input from the user. If in step 220 the intended message is incomplete, the processing system 106 initiates a reminder alarm action by setting 230 a reminder alarm to notify the user that the inbound message is incomplete or the completed inbound message has yet to be sent. At subsequent predetermined intervals, the processing system 106 will repeatedly cause the conventional alert element 118 to remind the user of the incomplete message. The reader will appreciate that the conventional alert element 118 can be programmed to alert the user, utilizing a distinct notification means, that an incomplete message exists. The conventional alert element 118 preferably communicates to the user the alarm action that differs from normal messaging alerts, information services message alerts, and other alerts. In step 246, the user completes the intended message to be sent as an inbound message based on the alarm action. After step 246, the flowchart continues on to step 212. Similarly, a negative response to the decision of step 220 allows the method to proceed to step 212. Steps 220 and 246 cause the method to proceed to a multi-step action 214 that evaluates a characteristic of the intended message including steps 220, 212, 216, 218, 222, and 240.

In step 212 the processor 110 of the processing system 106 determines whether the user has generated an intended message to be sent as an inbound message by selecting a programmed message having a pre-designated alarm action. In the case where step 212 yields a positive response, the method continues in step 218 where the processor 110 accesses an alarm action indication 130 corresponding to the programmed messages 134 selected by the user. Programmed messages are comprised of, yet not limited to: messages hard-coded in the SU 100 prior to service activation, messages created by the user prior to the receipt of the outbound message from the messaging system, and unique message responses created by the originator of an outbound message and delivered as a part of the outbound message. Once the alarm action associated with the programmed message has been accessed, step 218 is followed by step 226 in which the processing system 106 initiates a reminder alarm action based on the programmed message. The reminder alarm action can comprise, for example, setting an alarm, not setting any alarm, or displaying a menu of possible alarm actions for the user to select. The reader will recognize that when an alarm subsequently results from the initiation of the reminder alarm action, the user interface 114 preferably communicates to the user a description of the reason for the alarm. The processing system 106 then transmits the inbound message in step 228 and the process ends 244. Though the current embodiment in accordance with the instant invention depicts a method where the initiation 226 of the reminder alarm action precedes the transmission 228 of the inbound message, it is understood that in an alternative implementation step 228 may be executed prior to step 226.

Returning to the decision of step 212, a negative response allows the method to proceed to step 216 in which the processing system 106 determines whether the intended message address is included in the list of addresses 128 stored in the subscriber unit 100. The user has the capability to input into the memory 112 of the SU 100 utilizing the user interface 114 a list of addresses identifying other electronic devices that the SU 100 may receive messages from and that are considered important by the user. Upon receipt of the outbound message transmitted from the messaging system initiated by another electronic device, the processing system 106 can compare the address of the outbound message originator with addresses stored in the memory 112. Upon receipt of outbound messages originating from a particular address, a predetermined set of reminder alarm actions is automatically initiated by the SU 100. This convenience allows the user the opportunity to customize the method of initiating the reminder alarm action. In the case where the address included in the outbound message has a match with an address in the memory 112, step 216 proceeds to step 232 to initiate a reminder alarm action by automatically displaying an alarm action menu on the display 116. The user then has the option of choosing 234 an alarm action from the alarm action menu. Once the user has communicated the choice to the SU 100, step 236 of the method executes the alarm action chosen in step 234. In this process of initiating a reminder alarm action based on addressing constraints, the subscriber unit 100 transmits 242 the inbound message, and the process ends 244. It will be appreciated by the reader that the transmission 242 of the inbound message may be completed at any point in time once step 214 is completed.

If in step 216 the intended message address is not included 216 in the list of addresses stored in the SU, the method continues with step 222 in which the processing system 106 determines whether a character string of the intended message is included in the list of character strings 134 stored in the memory 112 of the SU 100. This allows the user to customize the initiation of specific reminder alarm actions based upon specific information that may be included in any message to be transmitted as an inbound message. For example, the phrase "will call" can be included to detect a promised further action to be taken by the user. A positive response to step 222 results in displaying 232 the alarm action menu, so that the user can choose 234 a desired alarm action. In the case where step 222 determines that there is no match between the information included in the intended message to be sent as an inbound message and the list of character strings 132, no alarm action is initiated 240. Step 242 transmits the inbound message and the process ends 244. As previously noted, the reader will appreciate that the transmission 242 of the inbound message may be completed at any point in time once step 214 is completed.

The reader will recognize that preferably when a reminder alarm subsequently occurs as a result of the reminder alarm action being initiated 226, the reminder alarm being set 230, or the alarm action being executed 236, the user interface 114 generates an appropriate and distinctive alarm and communicates to the user a description of the reason for the particular alarm.

Thus, it should be clear from the preceding disclosure that the present invention provides a method and apparatus for initiating a reminder alarm action in a subscriber unit. The method and apparatus advantageously allows the subscriber unit to automatically initiate the reminder alarm action while providing the user the opportunity, with minimal user interaction with the SU, to avoid unintentional deactivation of the notification alarm and subsequently to fall short of timely completion of tasks related to the outbound message Many modifications and variations of the present invention are possible in light of the above teachings. Thus, it is to be understood that, within the scope of the appended claims, the invention can be practiced other than as described herein above.

What is claimed is:

1. A method of initiating a reminder alarm action in a subscriber unit of a messaging system, the method comprising the steps of:
    generating, by a user of the subscriber unit, an intended message to be sent as an inbound message;
    evaluating a characteristic of the intended message, including the step of determining whether the intended message is incomplete; and
    initiating the reminder alarm action in response to the evaluating step, including the step of setting a reminder alarm in response to determining that the intended message is incomplete.

2. The method of claim 1,
    wherein the step of evaluating includes the step of comparing an address to which the intended message is to be sent with a list of addresses stored in the subscriber unit, and
    wherein the step of initiating includes the step of initiating the reminder alarm action in response to finding a matching address in the list of addresses.

3. The method of claim 1, wherein the step of initiating includes the step of setting a reminder alarm.

4. The method of claim 1, wherein the step of initiating includes the step of displaying an alarm action menu.

5. The method of claim 1, wherein the step of evaluating includes the step of negating the step of initiating the reminder alarm action.

6. The method of claim 1,
    wherein the step of generating includes the step of selecting, by the user of the subscriber unit, a programmed message to be sent as the inbound message, and
    wherein the step of evaluating includes the step of accessing an alarm action indication corresponding to the programmed message.

7. The method of claim 1,
    wherein the step of evaluating includes the step of comparing a character string of the intended message with a list of character strings stored in the subscriber unit, and
    wherein the step of initiating includes the step of initiating the reminder alarm action in response to finding a matching character string in the list of character strings.

8. A subscriber unit for initiating a reminder alarm action in a messaging system, the subscriber unit comprising:
    a user interface for generating, by a user of the subscriber unit, an intended message to be sent as an inbound message;
    a processing system coupled to the user interface and programmed to evaluate a characteristic of the intended message, including determining whether the intended message is incomplete, and to initiate the reminder alarm action in response to the characteristic, including setting a reminder alarm in response to determining that the intended message is incomplete; and
    a transmitter coupled to the processor for transmitting the intended message.

9. The subscriber unit of claim 8,
    wherein the processing system comprises:
        a memory, and
    wherein the processing system is further programmed to:
        compare an address to which the intended message is to be sent with a list of addresses stored in the memory, and
        initiate the reminder alarm action in response to finding a matching address in the list of addresses.

10. The subscriber unit of claim 8, wherein the processing system is further programmed to set a reminder alarm in response to the characteristic.

11. The subscriber unit of claim 8, wherein the processing system is further programmed to display an alarm action menu in response to the characteristic.

12. The subscriber unit of claim 8, wherein the processing system is further programmed to negate initiation of the reminder alarm action in response to the characteristic.

13. The subscriber unit of claim 8,
wherein the processing system comprises a memory, and
wherein the memory, includes a programmed message to be sent as the inbound message, and a corresponding alarm action indication, and
wherein the processing system is further programmed to: allow the user to select the programmed message, and access the alarm action indication corresponding to the programmed message selected.

14. The subscriber unit of claim 8,
wherein the processing system comprises a memory, and
wherein the processing system is further programmed to:
compare a character string of the intended message with a list of character strings stored in the memory, and
initiate the reminder alarm action in response to finding a matching character string in the list of character strings.

* * * * *